O. E. ALLEN.
DOMESTIC COOKING UTENSIL.
APPLICATION FILED DEC. 12, 1910.
1,005,919.
Patented Oct. 17, 1911.
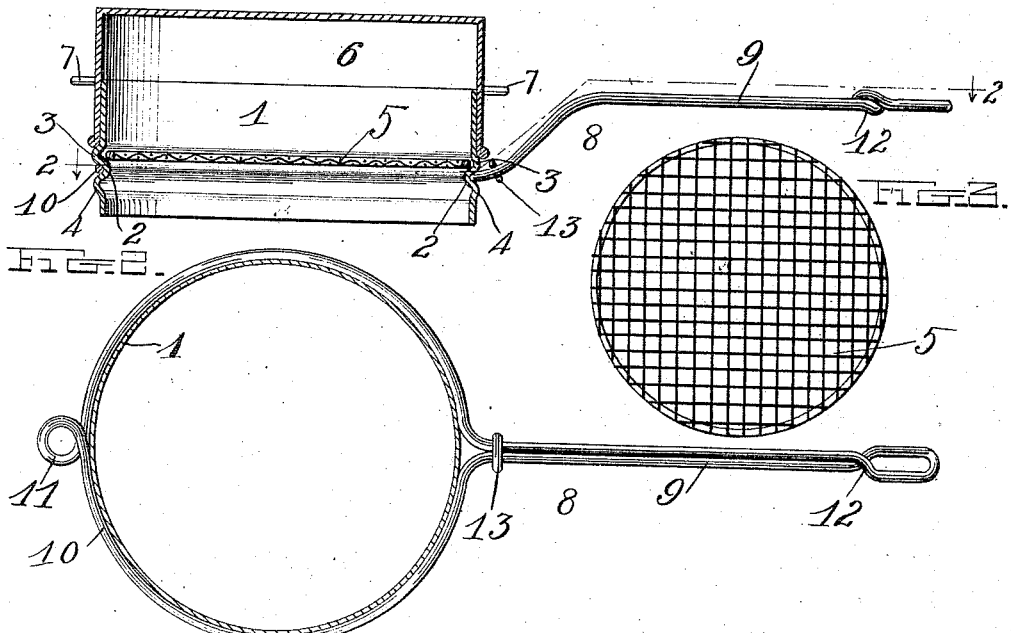
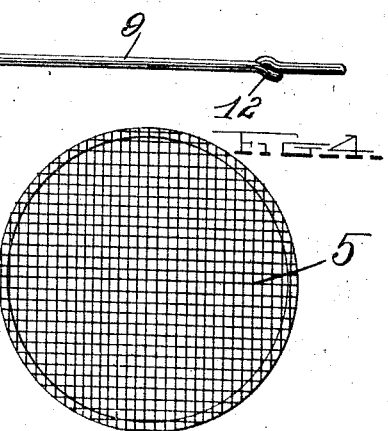
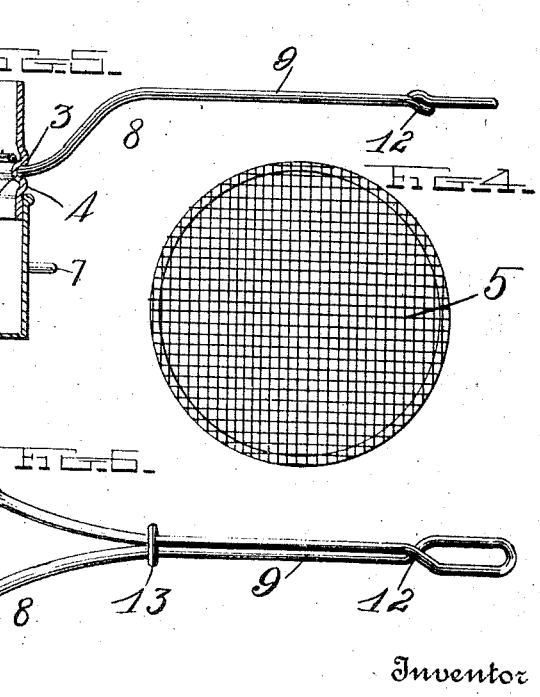
Witnesses
J. R. Pierce
C. B. Hopkins
Inventor
O. E. Allen
by H. B. Willson & Co.
Attorneys

UNITED STATES PATENT OFFICE.

ORVILLE E. ALLEN, OF HORNELL, NEW YORK.

DOMESTIC COOKING UTENSIL.

1,005,919.  Specification of Letters Patent.  Patented Oct. 17, 1911.

Application filed December 12, 1910. Serial No. 596,913.

*To all whom it may concern:*

Be it known that I, ORVILLE E. ALLEN, a citizen of the United States, residing at Hornell, in the county of Steuben and State of New York, have invented certain new and useful Improvements in Domestic Cooking Utensils; and I do declare the following to be a full, clear, and exact description of the invention, such as will enable others skilled in the art to which it appertains to make and use the same.

This invention relates to improvements in domestic cooking utensils.

One object of the invention is to provide a cooking utensil which may be employed for various uses such as corn popping, bread toasting, shirring, baking and similar operations and which may also be used as a colander for straining or sifting purposes.

Another object is to provide a cooking utensil of this character having means whereby all the heat employed as the cooking agent is retained and utilized in the cooking operation thereby providing a considerable saving of fuel, time and labor.

With the foregoing and other objects in view, the invention consists of certain novel features of construction, combination and arrangement of parts as will be more fully described and particularly pointed out in the appended claims.

In the accompanying drawings: Figure 1 is a central vertical section through my improved cooking utensil showing the parts assembled in position for cooking; Fig. 2 is a horizontal sectional view on the line 2—2 of Fig. 1 showing the construction and manner of attaching the handle of the utensil; Fig. 3 is a plan view of the combined food supporting and straining trays employed in connection with the utensil; Fig. 4 is a similar view showing a tray having openings of different size from those of the tray shown in Fig. 3; Fig. 5 is a central vertical section showing the parts arranged as a colander or strainer; Fig. 6 is a plan view of the handle removed from the utensil.

My improved cooking utensil comprises a body portion 1, which may be of any suitable shape and constructed of any suitable material, but is preferably formed of sheet metal of cylindrical form as shown. In the sides of the body portion 1 near its lower edge are formed a series of annular beads or corrugations 2, 3 and 4. The corrugations or beads are preferably pressed from the metal of which the body portion is formed and the bead 2 projects inwardly while the beads 3 and 4 project outwardly as shown.

The inwardly projecting bead or corrugation 2 forms an annular support for a removable circular tray or one of a series of trays 5 which are constructed of wire netting or other foraminous material. The meshes or openings in the various trays are of different size or grades of fineness whereby different trays may be employed in the utensil according to the purpose for which it is to be used or the kind of food to be prepared therein.

Adapted to be engaged with either the upper or lower portion of the body 1 is a combined cover or hood and receptacle 6, which hood when engaged with the upper portion of the body 1 serves as a cover for confining the heat in the body portion of the utensil whereby the cooking operation is greatly expedited. When the hood 6 is engaged upon the upper portion of the utensil the lower edges of the hood will rest on the annular bead or corrugation 3 and the hood be thereby supported in position. When the utensil is used as a colander the hood is engaged upon the lower portion of the body 1 and serves as a receptacle for the material strained or sifted through the trays. When the hood is thus arranged on the lower portion of the body 1 to form the receptacle the upper edge of the hood is engaged with the lower bead or corrugation 4 by means of which the body of the utensil is supported on the hood. The hood 6 is preferably provided on its opposite side with suitable handles 7 whereby the same may be readily engaged with and removed from the body portion of the utensil.

In connection with the utensil I preferably provide a suitable handle 8 which is detachably engaged in the groove in the side of the receptacle formed by the inwardly projecting bead or corrugation 2. The handle 8 is preferably formed of a wire rod bent to form a long handle portion 9 and a utensil engaging ring 10. The ends of the wire rod after forming the ring 10 are twisted together and into the form of an eye 11 which provides a short handle which is located in line with and on the opposite side of the ring 10 from the long handled portion 9. The wire rods forming the bars of the long handle 9 are twisted together near the looped ends of said rods as shown at 12. With the long handle-forming portion of the rods is slidably engaged a clamping ring 13 which is adapted to be slipped up onto the diverging inner ends of the bars forming the handle portion 9 thereby drawing said diverging ends together and thus gripping the utensil-engaging ring into tight engagement with the groove formed by the bead or corrugation 2 in the body 1 of the utensil.

By means of a cooking utensil constructed as herein shown and described it will be readily seen that the heat which is usually wasted in cooking operations of the character described will be retained and applied for the purpose of increasing the capacity of the utensil and more quickly and perfectly preparing the food placed therein. By thus increasing the cooking capacity or qualities of the utensil a saving of fuel as well as of time and labor is also accomplished.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A combined cooking utensil and colander comprising an open ended body of even outside diameter at its opposite ends and provided on its periphery between its ends with outward projections and an inward projection, a foraminated tray removably fitted within the body and resting upon the inward projection, a member consisting of a portion closed at one end and adapted to be telescoped upon either end of the body and to engage one of the outward projections and a suitable handle adapted to be removably clamped upon the body.

2. A combined cooking utensil and colander comprising an open ended body of even outside diameter at its opposite ends and provided on its periphery between its ends with outward projections and an inward projection, a foraminated tray removably fitted within the body and resting upon the inward projection, a member consisting of a portion closed at one end and adapted to be telescoped upon either end of the body and to engage one of the outward projections and a suitable removable handle comprising a ring clamping the body between the outward projections.

3. A combined cooking utensil and colander comprising an open ended cylindrical body of even diameter at its ends and provided between its ends with a series of corrugations forming an annular groove in the outside, an annular bead on the inside and an upper and lower annular bead on the outside inclosing the annular groove, a foraminated tray removably fitting within the body and resting on the inner annular bead, and a member consisting of a cylindrical body with one closed end adapted to be removably fitted upon either end of the main body with its inner edge engaging one of the outer annular beads.

4. A combined cooking utensil and colander comprising an open ended cylindrical body of even diameter at its ends and provided between its ends with a series of corrugations forming an annular groove in the outside, an annular bead on the inside and an upper and lower annular bead on the outside inclosing the annular groove, a foraminated tray removably fitting within the body and resting on the inner annular bead, and a member consisting of a cylindrical body with one closed end adapted to be removably fitted upon either end of the main body with its inner edge engaging one of the outer annular beads and a handle comprising a ring adapted to be seated and clamped in the outer annular groove of the main body.

In testimony whereof I have hereunto set my hand in presence of two subscribing witnesses.

ORVILLE E. ALLEN.

Witnesses:
C. E. CARNEY,
W. P. KERR.